United States Patent
Takahashi et al.

(10) Patent No.: US 10,333,398 B2
(45) Date of Patent: Jun. 25, 2019

(54) CHARGING APPARATUS

(71) Applicant: Hitachi Automotive Systems, Ltd., Hitachinaka-shi, Ibaraki (JP)

(72) Inventors: Naoya Takahashi, Hitachi (JP); Hiroyuki Shoji, Hitachinaka (JP); Takae Shimada, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/749,589

(22) PCT Filed: Jul. 20, 2016

(86) PCT No.: PCT/JP2016/071200
§ 371 (c)(1),
(2) Date: Feb. 1, 2018

(87) PCT Pub. No.: WO2017/022477
PCT Pub. Date: Feb. 9, 2017

(65) Prior Publication Data
US 2018/0241306 A1  Aug. 23, 2018

(30) Foreign Application Priority Data
Aug. 6, 2015  (JP) .................................. 2015-155622

(51) Int. Cl.
*H02J 7/00* (2006.01)
*H02J 7/02* (2016.01)
(Continued)

(52) U.S. Cl.
CPC ............. *H02M 3/155* (2013.01); *H02J 7/007* (2013.01); *H02J 7/0022* (2013.01); *H02J 7/022* (2013.01);
(Continued)

(58) Field of Classification Search
USPC ........................................................ 320/107
See application file for complete search history.

(56) References Cited

U.S. PATENT DOCUMENTS

| | | | | |
|---|---|---|---|---|
| 2009/0237019 A1* | 9/2009 | Yamakawa | ........... | H02P 23/009 318/400.09 |
| 2010/0220501 A1* | 9/2010 | Krause | .............. | H02M 3/33584 363/17 |
| 2010/0321960 A1* | 12/2010 | Nakahori | ............ | H01F 27/2804 363/21.04 |

FOREIGN PATENT DOCUMENTS

| | | |
|---|---|---|
| JP | 2009-232502 A | 10/2009 |
| JP | 2014-135847 A | 7/2014 |
| JP | 2015-35928 A | 2/2015 |

OTHER PUBLICATIONS

International Search Report (PCT/ISA/210) issued in PCT Application No. PCT/JP2016/071200 dated Sep. 13, 2016 with English translation (2 pages).

(Continued)

*Primary Examiner* — Robert J Grant
(74) *Attorney, Agent, or Firm* — Crowell & Moring LLP

(57) ABSTRACT

There is a disadvantage that a loss generated in a charging apparatus becomes large. It is determined whether a link voltage Vo is equal to or higher than a predetermined value Va. If the link voltage Vo is less than the predetermined value Va, a control unit activates a DC-DC converter in a boosting operation. That is, by turning on/off the switching element, the voltage boosted from the storage battery is supplied to the link voltage Vo. The control unit determines whether the link voltage Vo is equal to or higher than the predetermined value Va. If the link voltage Vo is less than the predetermined value Va, the operation is continued. When the link voltage Vo rises due to the boosting operation of the DC-DC converter and becomes equal to or higher than the (Continued)

predetermined value Va, the boosting operation of the DC-DC converter is stopped.

8 Claims, 7 Drawing Sheets

(51) Int. Cl.
    *H02M 3/155*     (2006.01)
    *H02M 1/36*     (2007.01)
    *H02M 3/337*     (2006.01)
    *H02J 7/34*     (2006.01)
    *H02M 3/28*     (2006.01)
    *H02M 1/00*     (2006.01)

(52) U.S. Cl.
    CPC ................ *H02J 7/34* (2013.01); *H02M 1/36* (2013.01); *H02M 3/28* (2013.01); *H02M 3/3376* (2013.01); *H02M 2001/007* (2013.01); *H02M 2001/008* (2013.01); *H02M 2001/0058* (2013.01); *Y02B 40/90* (2013.01); *Y02B 70/1433* (2013.01); *Y02B 70/1491* (2013.01); *Y02T 10/7055* (2013.01)

(56) References Cited

OTHER PUBLICATIONS

Japanese-language Written Opinion (PCT/ISA/237) issued in PCT Application No. PCT/JP2016/071200 dated Sep. 13, 2016 (4 pages).

\* cited by examiner

CHARGING APPARATUS

TECHNICAL FIELD

The present invention relates to a charging apparatus.

BACKGROUND ART

In recent years, electric vehicles and plug-in hybrid vehicles have become widespread. In these vehicles, a storage battery for supplying power to a motor when a vehicle is running is mounted. When the storage battery is charged from a commercial AC power supply, a charging apparatus having a high conversion efficiency and including a current resonance type converter having a function to insulate the AC power supply and the storage battery. Generally, the current resonance type converter can easily realize high efficiency. However, it is difficult to realize both a constant current characteristic at low voltage and low current at the time of startup of a charging apparatus and a constant current characteristic at the time of normal operation. For example, PTL 1 discloses a method for improving compatibility between the constant current characteristic at low voltage and low current at the time of startup and the constant current characteristic at the time of normal operation by adding a switch for separating an auxiliary winding circuit and a main circuit.

CITATION LIST

Patent Literature

PTL 1: JP 2014-135847 A

SUMMARY OF INVENTION

Technical Problem

However, the technique described in PTL 1 has a disadvantage that a loss generated in a charging apparatus becomes large.

Solution to Problem

A charging apparatus according to the present invention includes a current resonance type converter, a DC-DC converter, and a control unit. The current resonance type converter includes an inverter circuit which inputs a DC voltage and generates a rectangular wave voltage, a transformer which magnetically couples a primary winding and a secondary winding connected between output terminals of the inverter circuit, a resonant capacitor and a resonant inductor connected in series with the primary winding and/or the secondary winding, a rectifier circuit which rectifies and outputs an alternating current output to the secondary winding, and a smoothing capacitor connected between output terminals of the rectifier circuit. The DC-DC converter is connected between the smoothing capacitor and a storage battery. The control unit controls the current resonance type converter and the DC-DC converter. Before starting a switching operation of the current resonance type converter, the control unit controls a voltage of the smoothing capacitor to a predetermined voltage which is higher than a voltage of the storage battery by boosting a voltage of the DC-DC converter.

Advantageous Effects of Invention

According to the present invention, a highly efficient and compact charging apparatus can be provided by reducing generated loss.

DESCRIPTION OF EMBODIMENTS

First Embodiment

Figure 1:
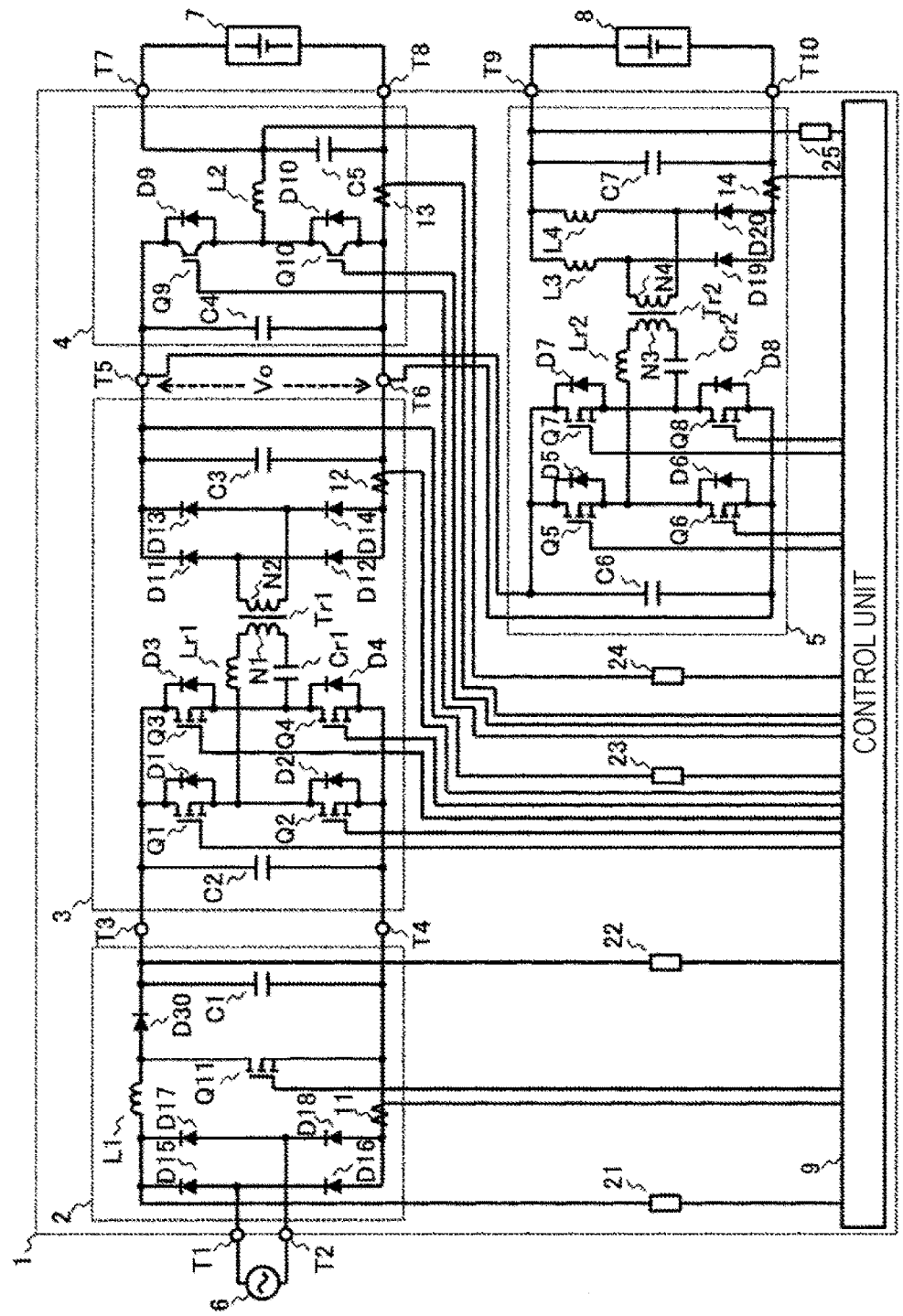
FIG. 1 is a circuit configuration diagram of a charging apparatus according to a first embodiment.

Hereinafter, a first embodiment of the present invention will be described with reference to FIGS. 1 to 3. FIG. 1 is a circuit configuration diagram of a charging apparatus 1 according to the first embodiment. The charging apparatus 1 inputs AC power between terminals T1 and T2 from an AC power supply 6, outputs DC power between terminals T7 and T8 and between terminals T9 and T10, and charges storage batteries 7 and 8. Further, when the AC power supply 6 is not connected, the charging apparatus 1 converts power between the storage batteries 7 and 8 and charges the storage battery 8 from the storage battery 7. Here, the storage battery 7 is a high-voltage battery in which such as a plurality of lithium-ion batteries are connected, and the storage battery 8 is a low-voltage battery such as a lead battery. However such as a type and a voltage level of the storage battery may be different. Further, although the AC power supply 6 is a commercial power source, a power generator may be used.

The charging apparatus 1 includes an AC-DC converter and a current resonance type converter 3. The AC-DC converter 2 inputs AC voltage and converts the AC voltage into a DC voltage. The current resonance type converter 3 inputs a DC voltage and outputs the DC voltage between terminals T5 and T6. Here, the voltage between the terminals T5 and T6 is referred to as a link voltage Vo. Further, the charging apparatus 1 includes DC-DC converters 4 and 5. The DC-DC converter 4 bi-directionally converts power between the link voltage Vo and the storage battery 7. The DC-DC converter 5 charges the storage battery 8 by inputting the link voltage Vo. Furthermore, the charging apparatus 1 includes a control unit 9 that controls the AC-DC converter 2, the current resonance type converter 3, and the DC-DC converters 4 and 5.

The AC-DC converter 2 includes bridged diodes D15 to D18, full-wave rectifies the AC voltage input between the terminals T1 and T2, and converts the AC voltage into a DC voltage. In the present embodiment, the diodes D15 and D16 and the diodes D17 and D18 are connected in series respectively, and the diodes connected in series are connected in parallel to form a bridge connection. The full-wave rectified voltage is input to a boosting chopper circuit including a reactor L1 connected to a DC terminal, a switching element Q11, a booster diode D30, and a smoothing capacitor C1. The boosting chopper circuit turns on/off the switching element Q11 in a switching operation, and the full-wave rectified voltage is boosted and output between T3 and T4 as a smoothed DC voltage. A switching operation signal of the switching element Q11 is output from the control unit 9. The AC-DC converter 2 further performs a power factor improvement control for bringing a voltage waveform of the AC power supply 6 and a current waveform input between the terminals T1 and T2 close to similar waveforms.

The current resonance type converter 3 converts the full-wave rectified DC voltage into an insulated DC voltage. The current resonance type converter 3 includes a rectangular wave inverter circuit including switching elements Q1 to Q4 and anti-parallel diodes D1 to D4. The switching elements Q1 and Q2 are connected in series to form a first arm, and the switching elements Q3 and Q4 are connected in series to form a second arm. Each arm is connected in parallel to form a bridge connection. Further, the current resonance type converter 3 includes a primary side winding N1 in which a resonant inductor Lr1 and a resonance capacitor Cr1 are connected in series at a connection point of the switching element Q1 and the switching element Q2, and a transformer Tr1 including a secondary side winding N2 magnetically coupled to the primary side winding N1 is provided. The secondary side winding N2 of the transformer Tr1 is provided with a rectifier circuit including bridged diodes D11 to D14. A connection point between a series connection point of the diodes D11 and D12 and a series connection point of the diodes D13 and D14 are connected to the secondary side winding N2 as an AC terminal.

The current resonance type converter 3 having the above-described configuration is a full bridge type LLC current resonance type converter. In the rectangular wave inverter circuit, among the full-bridged switching elements Q1 to Q4, by alternately turning on and off the pairs of Q1 and Q4 and Q2 and Q3 under control of the control unit 9, a rectangular wave AC voltage is generated from a voltage of a smoothing capacitor C2. Here, on-duty of the switching elements Q1 to Q4 is basically 50%, Q1 and Q4 are turned on and off at the same time, and Q2 and Q3 are turned on and off at the same time. The generated rectangular wave AC voltage is applied at both ends of a series connection body of the resonance capacitor Cr1, the resonant inductor Lr1, and the winding N1, which is connected to a connection point between a connection point of the switching elements Q1 and Q2 and a connection point of the switching elements Q3 and Q4. As a result, resonance of the resonance capacitor Cr1 and the resonant inductor Lr1 is caused, and a resonance current flows through the winding N1. The resonance current flowing through the winding N1 generates an AC induction current in the winding N2. The AC induction current is full-wave rectified by a rectifier circuit in which the rectifier diodes D11 to D14 are connected in full bridge, and the smoothed DC link voltage Vo is generated between the terminals T5 and T6 by a smoothing capacitor C3.

In the current resonance type converter 3, the rectangular wave inverter circuit is not limited to the full bridge configuration as long as a resonance current can flow through the series connection body of the resonance capacitor Cr1, the resonant inductor Lr1, and the winding N1. Further, the rectifier circuit is not limited to the full bridge connection of the rectifier diodes and may be any configuration as long as the alternating current induced to the winding N2 can be rectified and converted into direct current. Furthermore, although the resonance capacitor Cr1 and the resonant inductor Lr1 are connected in series with the winding N1, the resonance capacitor Cr1 and the resonant inductor Lr1 may be connected in series with the winding N2. Furthermore, the resonance capacitor Cr1 and the resonant inductor Lr1 may be connected in series to the winding N1 and the winding N2, respectively, and the resonant inductor Lr1 may be omitted by utilizing such as leakage inductance of the transformer Tr1.

Further, the anti-parallel diodes D1 to D4 are connected to the switching elements Q1 to Q4. However, parasitic diodes of MOSFETs may be used when the MOSFETs are used as the switching elements Q1 to Q4.

The DC-DC converter 4 is a bidirectional chopper including switching elements Q9 and Q10, anti-parallel diodes D9 and D10 connected in anti-parallel to the switching elements Q9 and Q10 respectively, a choke coil L2, and smoothing capacitors C4 and C5. In the DC-DC converter 4, a step-down chopper circuit includes the switching element Q9, the anti-parallel diode D10 of the switching element Q10, and the choke coil L2, and by turning on and off the switching element Q9, a voltage is stepped down from the link voltage Vo to charge the storage battery 7. Further, a boosting chopper circuit includes the switching element Q10, the anti-parallel diode D9 of the switching element Q9, and the choke coil L2, and by turning on and off the switching element Q10, the voltage boosted from the storage battery 7 is supplied to the link voltage Vo.

If MOSFETs are used for the switching elements Q9 and Q10, parasitic diodes of Q9 and Q10 can be used as anti-parallel diodes. However, the parasitic diodes of the MOSFETs have poor recovery characteristics and lead to increase in losses. Therefore, as the switching elements Q9 and Q10 and the anti-parallel diodes D9 and D10, an IGBT or SiC-MOSFET having anti-parallel diodes with superior recovery characteristics is preferably used.

The DC-DC converter 5 is a step-down type phase shift DC-DC converter including a pulse wave generating circuit including switching elements Q5 to Q8 and the anti-parallel diodes D5 to D8, a resonance capacitor Cr2, a resonant inductor Lr2, and a transformer Tr2 magnetically coupling a winding N3 to a winding N4, rectifier diodes D19 and D20, a current doubler rectifier circuit including choke coils L3 and L4, and smoothing capacitors C6 and C7. In the pulse wave generation circuit, an AC pulse voltage waveform is generated by switching with a phase difference between a pair of the switching elements Q5 and Q8 and a pair of the switching elements Q6 and Q7. Here, the on-duty of the switching elements Q5 to Q8 is basically 50%, the switching elements Q5 and Q8 are turned on and off at the same time, and the switching elements Q6 and Q7 are turned on and off at the same time. The generated pulse voltage waveform is applied to both ends of a series connection body of the resonance capacitor Cr2, the resonant inductor Lr2, and the winding N3, which is connected to a connection point between a connection point of the switching elements Q5 and Q6 and a connection point of the switching elements Q7 and Q8. A current flows through the winding N4, and an induction current generates in the winding N4. The induction current of the winding N4 is rectified and smoothed to a DC voltage by the current doubler rectifier circuit and the smoothing capacitor C7 to charge the storage battery 8.

The resonant inductor Lr2 can also be omitted by making use of such as leakage inductance of the transformer Tr2. Further, the current doubler rectifier circuit is not limited to the above configuration, and any configuration may be used as long as the alternating current induced in the winding N4 can be rectified and converted into direct current. The anti-parallel diodes D5 to D8 are connected to the switching elements Q5 to Q8. However, parasitic diodes of MOSFETs may be used when the MOSFETs are used as the switching elements Q5 to Q8.

The control unit 9 controls the switching elements Q1 to Q11 provided in the AC-DC converter 2, the current resonance type converter 3, the DC-DC converters 4 and 5. In the control unit 9, a voltage sensor 21, a voltage sensor 22, a current sensor 11, a current sensor 12, a voltage sensor 23, a voltage sensor 24, a current sensor 13, a voltage sensor 25, and a current sensor 14 are connected. The voltage sensor 21 detects a full-wave rectified DC voltage. The voltage sensor 22 detects an output voltage of the AC-DC converter 2. The current sensor 11 detects a current of the choke coil L1. The current sensor 12 detects an output current of the current resonance type converter 3. The voltage sensor 23 detects the link voltage Vo. The voltage sensor 24 detects a voltage of the storage battery 7. The current sensor 13 detects a current of the storage battery 7. The voltage sensor 25 detects a voltage of the storage battery 8. The current sensor 14 detects a current of the storage battery 8.

The current resonance type converter 3 is controlled by the control unit 9 and controls an output current or an output voltage by changing a switching frequency of the switching elements Q1 to Q4. Specifically, when the switching frequency is lowered, an impedance of a series connection body of the resonance capacitor Cr1, the resonant inductor Lr1, and the winding N1 decreases. Therefore, a resonance current and an output current increase. On the other hand, when the switching frequency is increased, the impedance of the series connection body of the resonance capacitor Cr1, the resonant inductor Lr1, and the winding N1 increases. Therefore, the resonance current and the output current decrease. The control unit 9, for example, compares the link voltage Vo detected by the voltage sensor 23 with a target voltage or compares the output current detected by the current sensor 12 with a target current. Based on each of or both of the comparison results, the switching frequency is lowered when the comparison result is less than the target value, and the current resonance type converter 3 is controlled to increase the switching frequency when the comparison result is equal to or greater than the target value.

Figure 2:
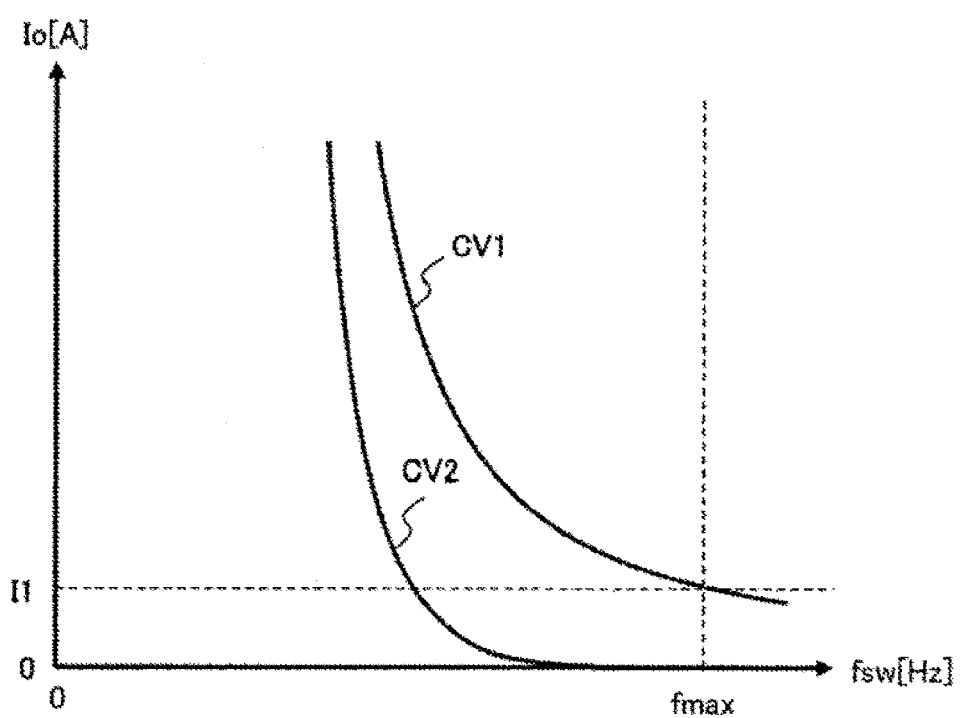
FIG. 2 is a characteristic diagram of a switching frequency and an output current of a current resonance type converter according to the first embodiment.

FIG. 2 is a diagram indicating an example of characteristics of a switching frequency and a output current of the current resonance type converter 3 included in the charging apparatus 1 indicated in FIG. 1. In FIG. 2, the horizontal axis represents switching frequencies of the switching elements Q1 to Q4 of the current resonance type converter 3 indicated in FIG. 1, and the vertical axis represents output current. A curve CV1 is a characteristic curve in the case where the output voltage, that is, the link voltage Vo is low, and a curve CV2 is a characteristic curve in the case where the link voltage Vo is high. As indicated by the curve CV1, when the link voltage Vo is low, the output current cannot be lowered even if the switching frequency is increased, and for example, a minimum current I1 flows also at the maximum switching frequency fmax. Therefore, for example, when the current resonance type converter 3 is activated under the condition that the link voltage Vo is low, an excessive current flows through such as the switching elements Q1 to Q4, the resonance capacitor Cr1, the resonant inductor Lr1, and the rectifier diodes D1 to D4. This excessive current can be reduced by increasing constants of resonance elements such as the resonant inductor Lr1 and the resonance capacitor Cr1. However, there are disadvantages such that these resonance elements increase in size, a circuit design is restricted, and losses at normal operation other than startup increase.

Therefore, in the present embodiment, before a rectangular wave inverter circuit of the current resonance type converter 3 starts a switching operation, a voltage of the smoothing capacitor C4 (link voltage Vo) is controlled to a voltage higher than the voltage of the storage battery 7 by boosting a voltage of the DC-DC converter 4. Then, after the link voltage Vo is controlled to a voltage higher than the voltage of the storage battery 7, the current resonance type converter 3 is activated. FIG. 3 is a flowchart indicating a procedure for activating the charging apparatus 1 according to the present embodiment. The description will be given below by using FIG. 3.

Figure 3:
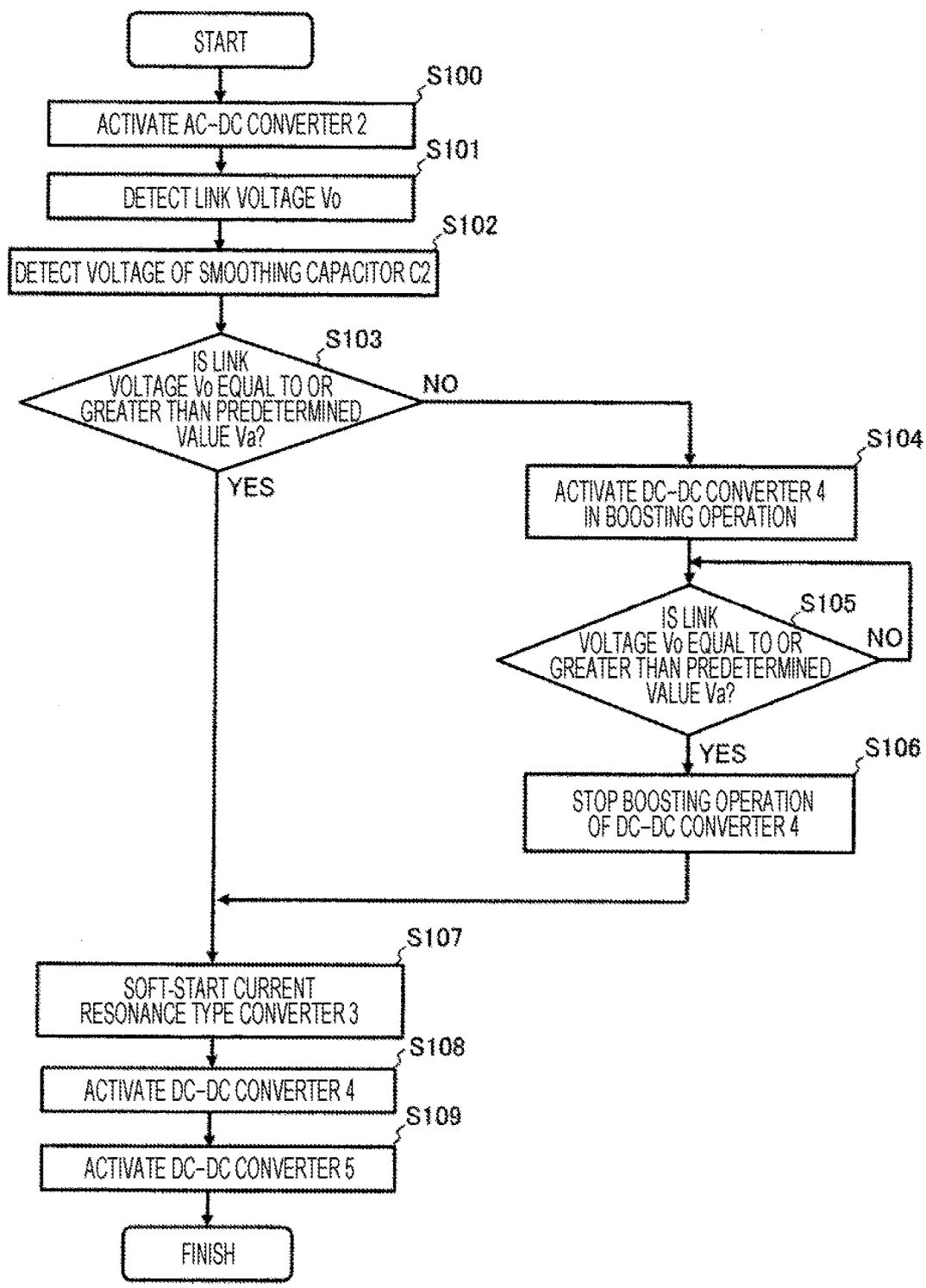
FIG. 3 is a flowchart indicating a startup procedure of the charging apparatus according to the first embodiment.

In step S100 of FIG. 3, the control unit 9 activates the AC-DC converter 2. The AC-DC converter 2 boosts a full-wave rectified voltage and outputs a smoothed DC voltage between T3 and T4 by a switching operation of the switching element Q11.

Next, in step S101, the control unit 9 detects the link voltage Vo by the voltage sensor 23. In step S102, the control unit 9 detects a voltage of the smoothing capacitor C2 by the voltage sensor 22.

Next, in step S103, the control unit 9 determines whether the link voltage Vo is equal to or higher than a predetermined value Va. Here, the predetermined value Va corresponds to the voltage indicated by the curve CV2 in FIG. 2 and is a preset value. When the link voltage Vo is equal to or higher than the predetermined value Va, there is no need to boost the link voltage Vo, and the process proceeds to step S107. If the link voltage Vo is less than the predetermined value Va, the process proceeds to step S104. In step S104, the control unit 9 activates the DC-DC converter 4 in a boosting operation. That is, by turning on/off the switching element Q10, the voltage boosted from the storage battery 7 is supplied to the link voltage Vo. In step S105, the control unit 9 determines whether the link voltage Vo is equal to or greater than the predetermined value Va. If the link voltage Vo is less than the predetermined value Va, the operation in step S105 is continued. When the link voltage Vo increases due to a boosting operation of the DC-DC converter 4 and becomes equal to or higher than the predetermined value Va, that is, when the link voltage Vo becomes higher than the voltage of the storage battery 7, the process proceeds to step S106 from step S105.

In step S106, the control unit 9 stops the boosting operation of the DC-DC converter 4. Then, in step S107, the current resonance type converter 3 is soft-started. The soft start is an operation of starting the switching elements Q1 to Q4 from the maximum switching frequency and gradually lowering the switching frequency. Upon completion of the soft start, the process proceeds to step S108.

In step S108, the control unit 9 activates the DC-DC converter 4 in a step-down operation. That is, by turning on/off the switching element Q9, the link voltage Vo is stepped down to charge the storage battery 7.

In step S109, the control unit 9 activates the DC-DC converter 5. That is, the switching elements Q5 to Q8 to which the link voltage Vo is applied are switching controlled, rectified, and smoothed to a DC voltage by the current doubler rectifier circuit and the smoothing capacitor C7 to charge the storage battery 8. Thereafter, the DC-DC converters 4 and 5 activated in steps S108 and S109 function as the charging apparatus 1 in normal operation and charge the storage batteries 7 and 8.

As described above, the switching frequency and the output current characteristic of the resonance type converter 3 can take the characteristics of CV2 in FIG. 2. Accordingly, it is possible to prevent an excessive current from flowing at the time of startup, and it is not necessary to increase such as a resonance element in size.

Second Embodiment

Figure 4:
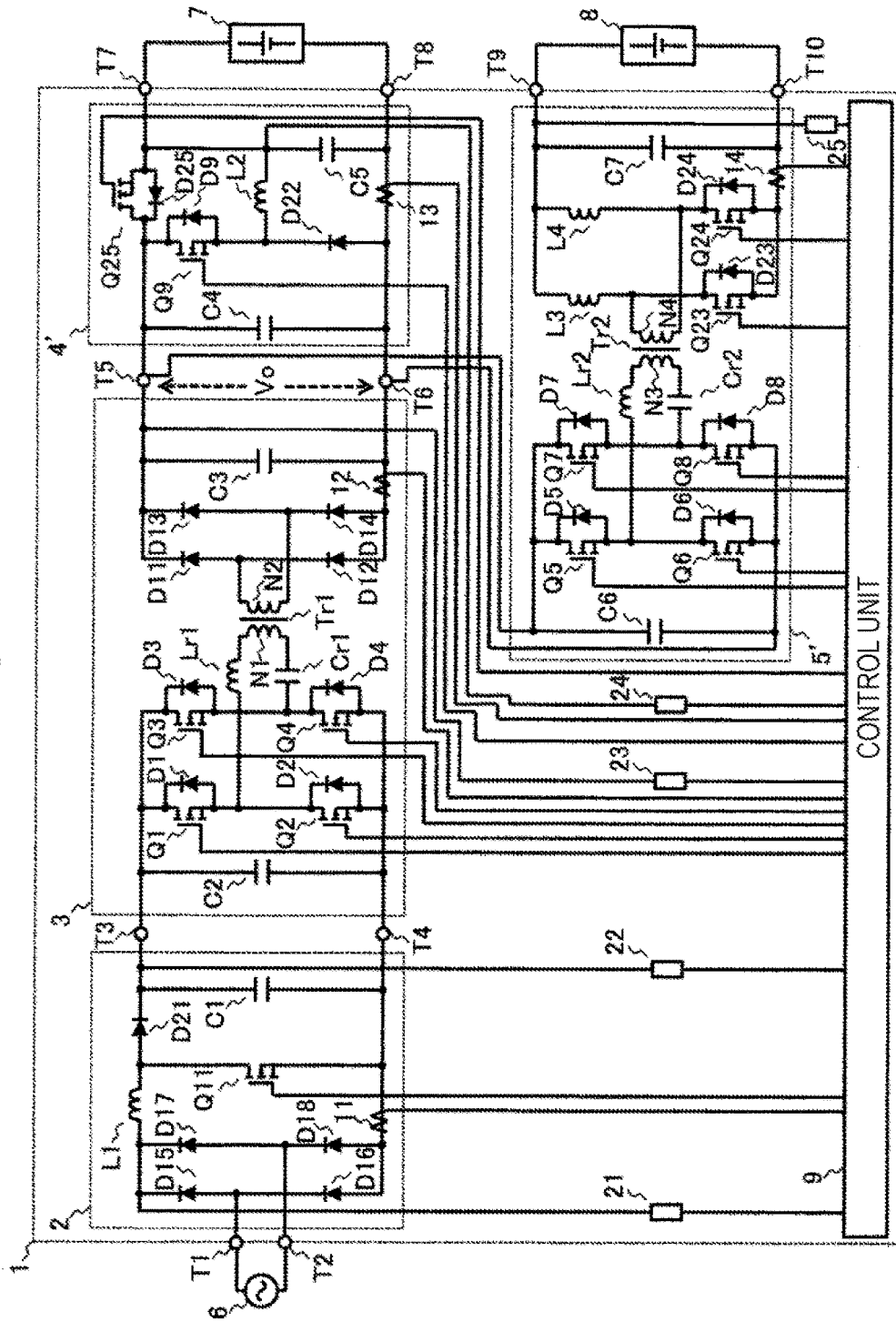
FIG. 4 is a circuit configuration diagram of a charging apparatus according to a second embodiment.

Next, a second embodiment of the present invention will be described with reference to FIGS. 4 and 5. FIG. 4 is a circuit configuration diagram of a charging apparatus 1 according to the second embodiment. FIG. 4 is different from the charging apparatus 1 indicated in FIG. 1 in the configuration of a DC-DC converter 4' and the configuration of a DC-DC converter 5'. The same portions as those of the charging apparatus 1 indicated in FIG. 1 are denoted by the same reference signs, and description thereof will be omitted.

The DC-DC converter 5' of the charging apparatus 1 in FIG. 4 is a bidirectional insulation type DC-DC converter capable of charging a storage battery 8 from a storage battery 7 or charging the storage battery 7 from the storage battery 8. The DC-DC converter 5' has a configuration in which diodes D19 and D20 of the rectifier circuit described in the DC-DC converter 5 in FIG. 1 are replaced by switching elements Q23 and Q24 and anti-parallel diodes D23 and D24. In the DC-DC converter 5', an operation of charging the storage battery 8 from the voltage of a smoothing capacitor C6 is the same as in the first embodiment. However, in a rectifier circuit at this time, a current flows through the anti-parallel diodes D23 and D24 instead of the rectifier diodes D19 and D20 in FIG. 1. If losses can be reduced, the switching elements Q23 and Q24 may be turned on and off at a predetermined timing synchronized with switching elements Q5 to Q8 to perform synchronous rectification.

In the case of charging the storage battery 7 from the storage battery 8 in the DC-DC converter 5', by turning on both of the switching elements Q23 and Q24, energy of the storage battery 8 is stored as magnetic energy in choke coils L3 and L4. On the other hand, by turning off either of the switching element Q23 or Q24, the energy stored in the choke coils L3 and L4 is released, and a current flows through a winding N4 of a transformer Tr2. Since the direction of the current flowing through the winding N4 in the case of turning off the switching element Q23 and the direction of the current flowing through the winding N4 in the case of turning off the switching element Q24 are opposite to each other, the current flowing through the winding N4 becomes an alternating current, and the alternating current is also induced in a winding N3 of the transformer Tr2. The alternating current induced in the winding N3 is rectified by bridge-connected anti-parallel diodes D5 to D8 and smoothed by the smoothing capacitor C6. If a loss can be reduced, the switching elements Q5 to Q8 may be turned on and off at a predetermined timing synchronized with the switching elements Q23 and Q24 to perform synchronous rectification.

The DC-DC converter 4' is a unidirectional step-down chopper that charges the storage battery 7 from a link voltage Vo. The DC-DC converter 4' includes a switching element Q9, a diode D22, a choke coil L2, and smoothing capacitors C4 and C5. Here, the switching element Q9 is a configuration using a MOSFET and the diode D22 is a configuration using a fast recovery diode having a superior recovery characteristic and the like. This configuration has an advantage that the loss of the DC-DC converter 4' can be reduced, and the charging loss of the storage battery 7 can be reduced from an AC power supply 6, as compared with the DC-DC converter 4 according to the first embodiment. Further, the DC-DC converter 4' includes a diode D25 between terminals T5 and T7. This diode D25 is connected in parallel to a switching element Q25. When the link voltage Vo and the voltage of the storage battery 7 are equal to each other, it is possible to bypass a conduction current of the choke coil L2 and the switching element Q9 by turning on the switching element Q25, and therefore the loss can be reduced.

A startup operation of a current resonance type converter 3 in the second embodiment will be described. In the present embodiment, the link voltage Vo is boosted by the DC-DC converter 5'. Further, a control unit 9 determines whether to boost the voltage according to a ratio between an input voltage and an output voltage of the current resonance type converter 3.

Figure 5:
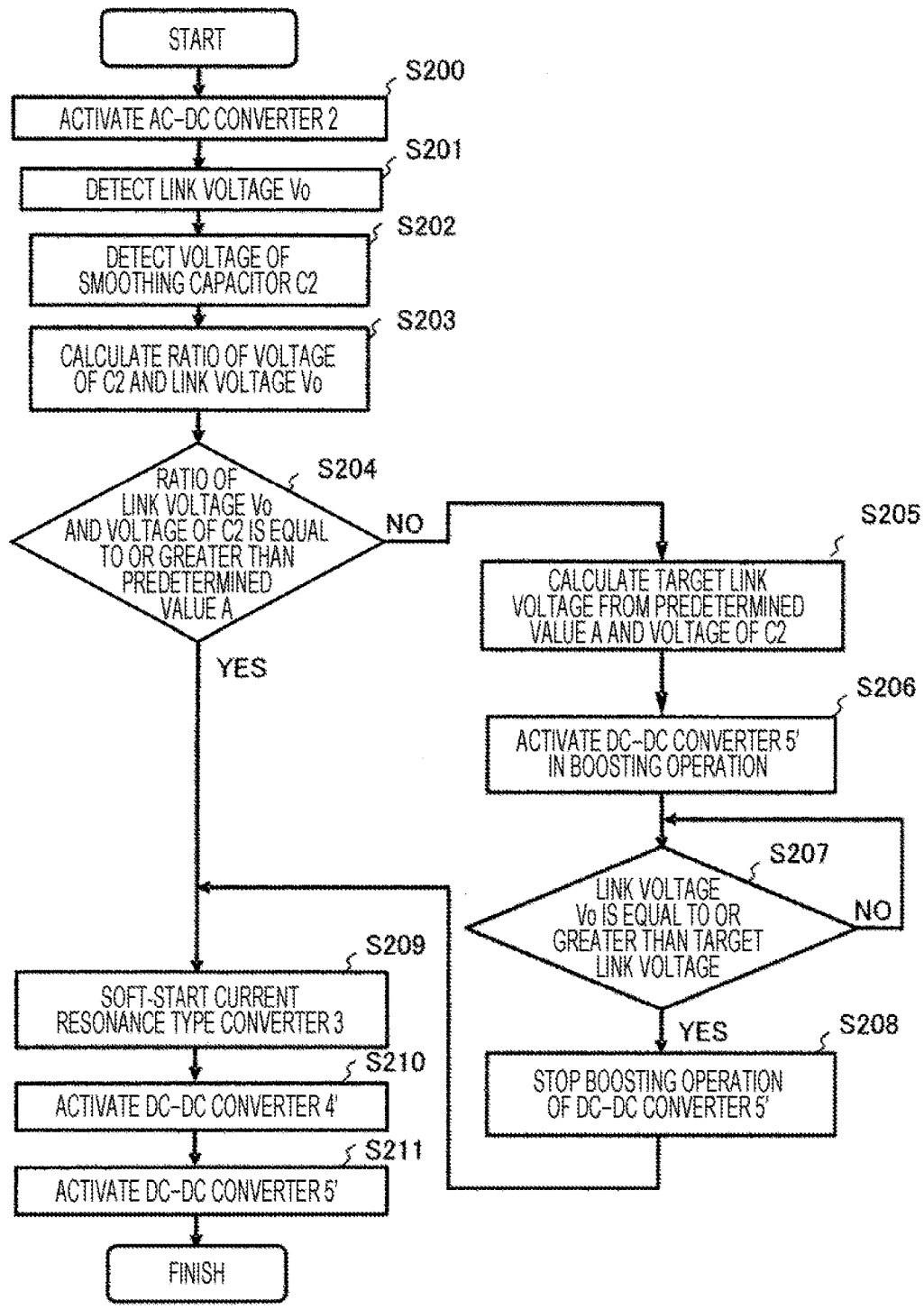
FIG. 5 is a flowchart indicating a startup procedure of the charging apparatus according to the second embodiment.

FIG. 5 is a flowchart indicating a procedure for activating the charging apparatus 1 according to the present embodiment. The description will be given below by using FIG. 5.

In step S200 of FIG. 5, the control unit 9 activates an AC-DC converter 2. The AC-DC converter 2 boosts a full-wave rectified voltage by a switching operation of a switching element Q11 and outputs a smoothed DC voltage between terminals T3 and T4.

Next, in step S201, the control unit 9 detects the link voltage Vo by a voltage sensor 23. In step S202, the control unit 9 detects a voltage of a smoothing capacitor C2 with a voltage sensor 22.

In step S203, the control unit 9 calculates a ratio between the link voltage Vo and the voltage Vc of the smoothing capacitor C2. Specifically, N×Vo÷Vc is calculated. Here, N is a turns ratio of a transformer Tr1. In step S204, the control unit 9 determines whether the ratio (N×Vo÷Vc) between the link voltage Vo and the voltage of the smoothing capacitor C2 is equal to or larger than a predetermined value A.

Here, the predetermined value A is a threshold for determining whether to perform a boosting operation of the DC-DC converter 5', and it is a value corresponding to a product of a transformer transformation ratio (a turns ratio N of the transformer Tr1) and an input/output voltage ratio (ratio of the output voltage (link voltage Vo) and the input voltage (voltage of the smoothing capacitor C2)) for limiting the output current of the current resonance type converter 3 to a desired current value or less. The predetermined value A is determined in advance according to how many amperes are desired to limit the output current.

For example, when the link voltage Vo is low, assuming that a turns ratio of the transformer Tr1 is N, and a voltage of the smoothing capacitor C2 is Vc, N×Vo may be lower or higher than Vc. The current resonance type converter 3 operates in the boost mode when N×Vo is lower than Vc, and it operates in the step-down mode when it is higher. In the step-down mode, as the product (N×Vo÷Vc) of the transformer transformation ratio of the current resonance type converter 3 and the input/output voltage becomes small, the output current becomes less restricted. Therefore, the link voltage Vo is increased by the boosting operation of the DC-DC converter 5' before activating the current resonance type converter 3, and the product of the transformer transformation ratio of the current resonance type converter 3 and the input/output voltage is increased.

An example of the predetermined value A is as follows. For example, when the current is desirably limited to 5 amperes or less, the predetermined value A is set to 0.7, and when 0.7<N×Vo÷Vc, the DC-DC converter 5' operates in the boost mode. When it is desired to limit the current to 1 ampere or less, the predetermined value A is set to 0.9, and when 0.9<N×Vo÷Vc, the DC-DC converter 5' is operated in the boost mode.

In step S204, when it is determined that the ratio between the link voltage Vo and the voltage Vc of the smoothing capacitor C2 is equal to or greater than the predetermined value A, the process proceeds to step S209. On the other hand, when it is determined that the ratio (N×Vo÷Vc) between the link voltage Vo and the voltage Vc of the smoothing capacitor C2 is less than the predetermined value A, the process proceeds to step S205.

In step S205, the control unit 9 calculates a target link voltage from the predetermined value A and the voltage of the smoothing capacitor C2. More specifically, the target link voltage is obtained by the following formula: target link voltage=predetermined value A×(voltage of the smoothing capacitor C2)÷(turns ratio N of the transformer Tr1).

In step S206, the control unit 9 activates the DC-DC converter 5' in a boosting operation. That is, by turning on both of the switching elements Q23 and Q24, energy of the storage battery 8 is stored as magnetic energy in the choke coils L3 and L4. Then, the alternating current induced in the winding N3 is rectified by the bridge-connected anti-parallel diodes D5 to D8, smoothed by the smoothing capacitor C6 and supplied to the link voltage Vo.

In step S207, the control unit 9 determines whether or not the link voltage Vo is equal to or higher than the target link voltage. If the link voltage Vo is equal to or higher than the target link voltage, the process proceeds to step S208. If the link voltage Vo is less than the target link voltage, the operation of step S207 is repeated.

In step S208, the control unit 9 stops the boosting operation of the DC-DC converter 5'. Then, in step S209, the current resonance type converter 3 is soft-started. In the soft-start, switching elements Q1 to Q4 are started from the maximum switching frequency, and the switching frequency is gradually lowered. Upon completion of the soft start, the process proceeds to step S210.

In step S210, the control unit 9 activates the DC-DC converter 4' in a step-down operation. That is, by turning on/off the switching element Q9, the voltage is stepped down from the link voltage Vo to charge the storage battery 7.

Next, in step S211, the control unit 9 activates the DC-DC converter 5' in a step-down operation. That is, the switching elements Q5 to Q8 are switching-controlled, rectified to a DC voltage by a rectifier circuit and the smoothing capacitor C7 to be smoothed to charge the storage battery 8. Thereafter, the DC-DC converters 4' and 5' activated in steps S210 and S211 function as the charging apparatus 1 in normal operation and charge the storage batteries 7 and 8.

In the second embodiment, a voltage of the DC-DC converter 5' is boosted according to a ratio between the input voltage and the output voltage of the current resonance type converter 3 to control the link voltage Vo to a voltage higher than the voltage of the storage battery 7. However, when the link voltage Vo is equal to or higher than the predetermined value Va as in the first embodiment, the DC-DC converter 5' may be operated in a boosting operation to control the link voltage Vo to a voltage higher than the voltage of the storage battery 7. As described above, since it is possible to prevent an excessive current from flowing at the time of startup, it is not necessary to increase such as a resonance element in size.

Third Embodiment

Figure 6:
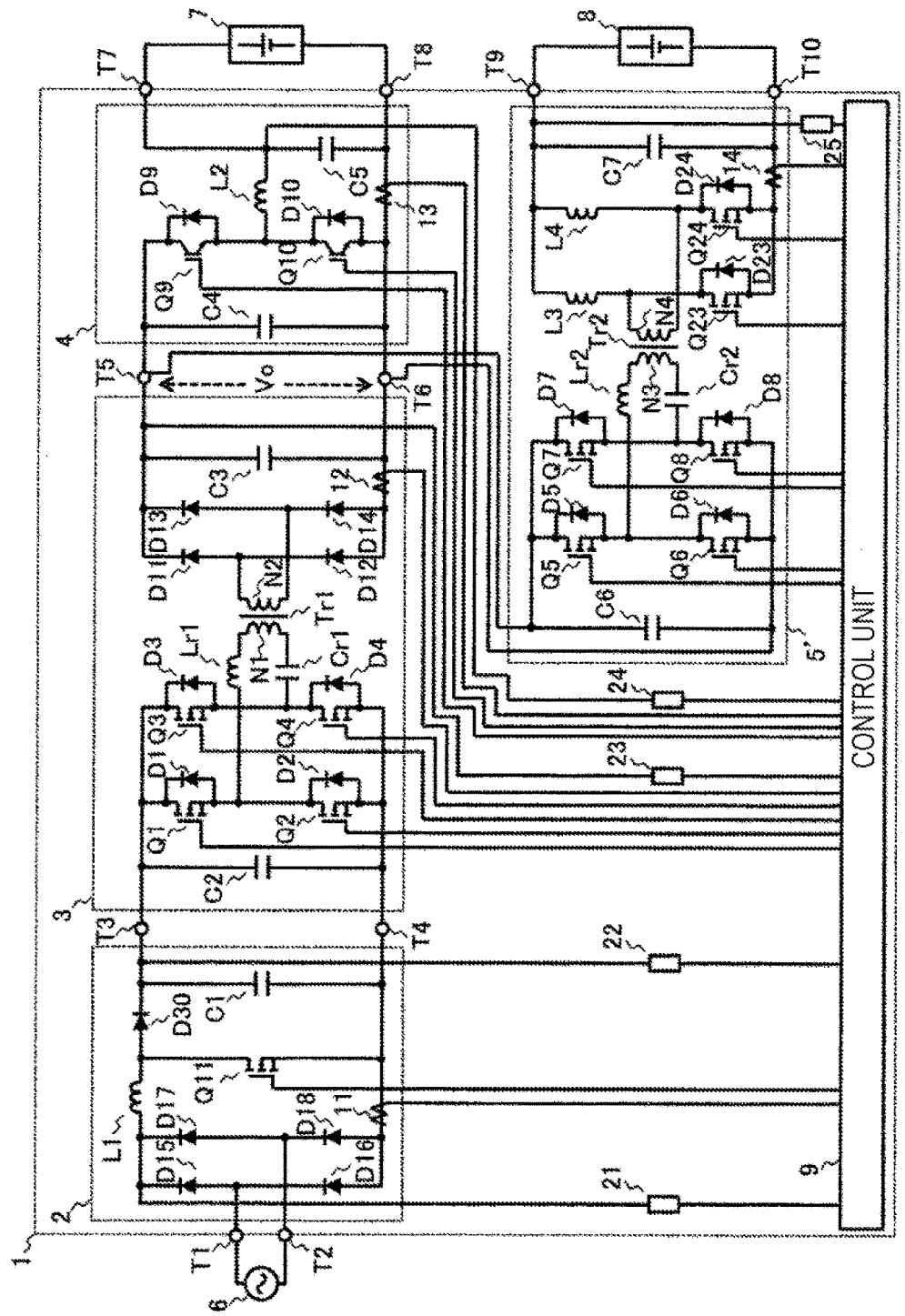
FIG. 6 is a circuit configuration diagram of a charging apparatus according to a third embodiment.

Next, a third embodiment of the present invention will be described with reference to FIGS. 6 and 7. FIG. 6 is a circuit configuration diagram of a charging apparatus 1 of the third embodiment. FIG. 6 is different from the charging apparatus 1 indicated in FIG. 1 in the configuration of a DC-DC converter 5'. However, the configuration of the DC-DC converter 5' is the same as that of the DC-DC converter 5' in the second embodiment indicated in FIG. 4. The same portions as those of the charging apparatus 1 indicated in FIGS. 1 and 4 are denoted by the same reference signs, and description thereof will be omitted.

Both of DC-DC converter 4 and the DC-DC converter 5' in FIG. 6 are bidirectional converters capable of boosting the link voltage Vo from a storage battery 7 or a storage battery 8. In the third embodiment, it is possible to alternatively select the DC-DC converter 4 or the DC-DC converter 5' which boosts the link voltage Vo.

Figure 7:
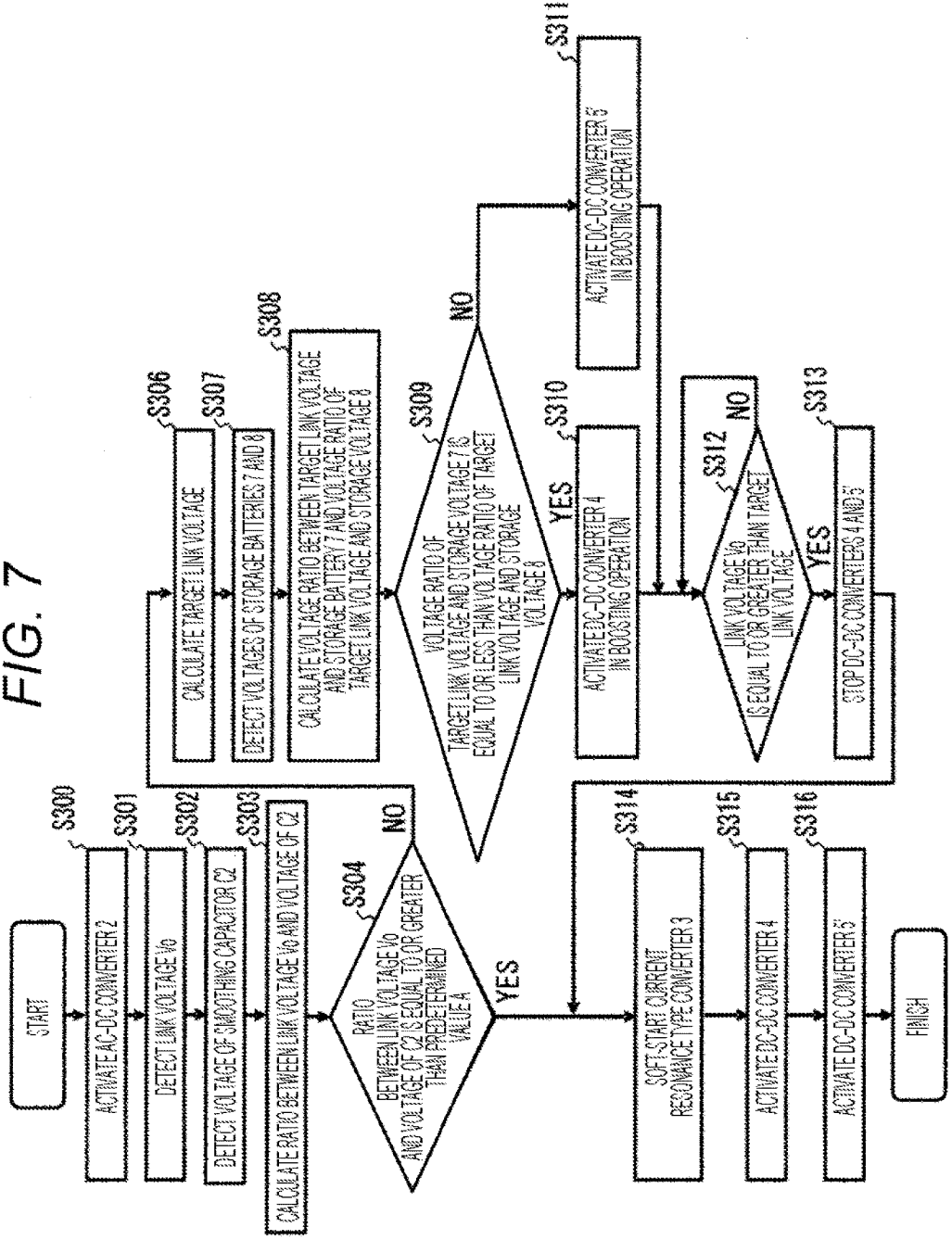
FIG. 7 is a flowchart indicating a startup procedure of the charging apparatus according to the third embodiment.

FIG. 7 is a flowchart indicating a procedure for activating the charging apparatus 1 according to the present embodiment. The description will be given below by using FIG. 7. In step S300 of FIG. 7, a control unit 9 activates an AC-DC converter 2. The AC-DC converter 2 boosts a full-wave rectified voltage by a switching operation of a switching element Q11 and outputs a smoothed DC voltage between T3 and T4. Next, in step S301, the control unit 9 detects a link voltage Vo by a voltage sensor 23. Then, in step S302, the control unit 9 detects the voltage of a smoothing capacitor C2 by a voltage sensor 22.

In step S303, the control unit 9 calculates a ratio (N×Vo÷Vc) of the link voltage Vo and the voltage Vc of the smoothing capacitor C2. In step S304, the control unit 9 determines whether or not the ratio (N×Vo÷Vc) of the link voltage Vo and the voltage Vc of the smoothing capacitor C2 is equal to or larger than a predetermined value A. Here, the predetermined value A is the same as the predetermined value described in step S203 in the second embodiment, and description thereof will be omitted.

In step S304, when it is determined that the ratio (N×Vo÷Vc) of the link voltage Vo and the voltage Vc of the smoothing capacitor C2 is equal to or larger than the predetermined value A, the process proceeds to step S314. On the other hand, if it is determined that the ratio (N×Vo÷Vc) of the link voltage Vo and the voltage Vc of the smoothing capacitor C2 is less than the predetermined value A, the process proceeds to step S306.

In step S306, the control unit 9 calculates a target link voltage from the predetermined value A and the voltage Vc of the smoothing capacitor C2. More specifically, the target link voltage is obtained by the following formula: target link voltage=predetermined value A×(voltage of the smoothing capacitor C2) (turns ratio N of the transformer Tr1).

In step S307, the control unit 9 detects the voltage of the storage battery 7 by a voltage detector 24 and the voltage of the storage battery 8 by a voltage detector 25. In the next step S308, the control unit 9 calculates a voltage ratio between the target link voltage calculated in step S306 and the storage battery 7 and a voltage ratio between the target link voltage and the storage battery 8.

In the next step S309, the control unit 9 determines whether a voltage ratio between the target link voltage and the storage battery 7 is equal to or smaller than a voltage ratio between the target link voltage and the storage battery 8. If the voltage ratio between the target link voltage and the storage battery 7 is equal to or smaller than the voltage ratio between the target link voltage and the storage battery 8, the process proceeds to step S310. In the process of step S309, it may be determined whether the voltage of the storage battery 7 is higher than the voltage of the storage battery 8.

In step S310, the control unit 9 activates the DC-DC converter 4 in a boosting operation. That is, by turning on/off a switching element Q10, the voltage of the storage battery 7 is boosted and supplied to the link voltage Vo. That is, when the voltage of the storage battery 7 is equal to or higher than the voltage of the storage battery 8, a voltage of the DC-DC converter 4 is boosted.

On the other hand, in step S309, if the voltage ratio between the target link voltage and the storage battery 7 is not equal to or smaller than the voltage ratio between the target link voltage and the storage battery 8, the process proceeds to step S311. In step S311, the control unit 9 activates the DC-DC converter 5' in a boosting operation. By turning on both of switching elements Q23 and Q24, the DC-DC converter 5' stores energy of the storage battery 8 as magnetic energy in choke coils L3 and L4. Then, the alternating current induced in a winding N3 of a transformer Tr2 is rectified by bridge-connected anti-parallel diodes D5 to D8, smoothed by a smoothing capacitor C6, and supplied to the link voltage Vo.

After the processes of steps S310 and S311, the process proceeds to step S312. In step S312, the control unit 9 determines whether or not the link voltage Vo is equal to or higher than the target link voltage. When it is equal to or higher than the target link voltage, the process proceeds to step S313. If the link voltage Vo is less than the target link voltage, the operation of step S312 is repeated.

In step S313, the control unit 9 stops the operation of the DC-DC converter 4 or the DC-DC converter 5' in the boosting operation. Then, in step S314, a current resonance type converter 3 is soft-started. In the soft start, switching elements Q1 to Q4 are started from the maximum switching frequency, and the switching frequency is gradually lowered. Upon completion of the soft start, the process proceeds to step S315.

In step S315, the control unit 9 activates the DC-DC converter 4 in a step-down operation. That is, by turning on/off a switching element Q9, the link voltage Vo is stepped down to charge the storage battery 7.

Next, in step S316, the control unit 9 activates the DC-DC converter 5' in a step-down operation. That is, switching elements Q5 to Q8 to which the link voltage Vo is applied are switching-controlled, rectified and smoothed to a DC voltage by a rectifier circuit and a smoothing capacitor C7 to charge the storage battery 8. Thereafter, the DC-DC converters 4 and 5' activated in steps S315 and S316 function as the charging apparatus 1 in normal operation and charge the storage batteries 7 and 8.

As described above, overdischarge of a storage battery can be prevented by preferentially using a storage battery having a higher voltage among the storage batteries 7 and 8. Further, by obtaining a ratio between the target link voltage and the voltages of the storage batteries 7 and 8, that is, a boosting ratio of the storage batteries 7 and 8, priority is given to the DC-DC converter 4 or the DC-DC converter 5' having a lower boosting ratio, it is possible to reduce the loss during boosting a voltage of the DC-DC converter 4 or the DC-DC converter 5'.

As described above, since it is possible to prevent an excessive current from flowing at the time of startup, it is not necessary to increase the size of such as a resonance element of the current resonance type converter 3. In addition, it is unnecessary to take into consideration constant current characteristics at low voltage and low current at the time of startup, and it is possible to provide a compact and highly effective current resonance type converter and charging apparatus which is optimized for the constant current characteristics during normal operation other than the time of startup.

According to the above-described embodiments, the following effects can be obtained. (1) The charging apparatus 1 includes the current resonance type converter 3, the DC-DC converter 4, and the control unit 9. The current resonance type converter 3 includes a rectangular wave inverter circuit which inputs a DC voltage and generates a rectangular wave voltage, the transformer Tr1 which magnetically couples the primary winding N1 and the secondary winding N2 connected between output terminals of the rectangular wave inverter circuit, the resonant capacitor Cr1 and the resonant inductor Lr1 connected in series with the primary winding N1 and/or the secondary winding N2, a rectifier circuit which rectifies and outputs an alternating current output to the secondary winding N2, and the smoothing capacitor C3 connected between output terminals of the rectifier circuit. The DC-DC converter 4 is connected between the smoothing capacitor C3 and the storage battery 7. The control unit 9 controls the current resonance type converter 3 and the DC-DC converter 4. Before starting a switching operation of the current resonance type converter 3, the control unit 9 controls a voltage of the smoothing capacitor C3 (link voltage Vo) to a predetermined voltage which is higher than a voltage of the storage battery 7 by boosting the voltage of the DC-DC converter 4. Accordingly, a highly efficient and compact charging apparatus can be provided by reducing generated loss.

(2) The storage battery includes the first storage battery 7 and the second storage battery 8. The DC-DC converter includes the DC-DC converter 4 connected between the smoothing capacitor C3 and the first storage battery 7 and the DC-DC converter 5 connected between the smoothing capacitor C3 and the second storage battery 8. The control unit 9 boosts a voltage of the DC-DC converter 4 and controls the voltage (link voltage Vo) of the smoothing capacitor C3 to a predetermined voltage before starting a switching operation of the current resonance type converter 3 (step S104). By boosting the voltage of the DC-DC converter 4, a highly efficient and compact charging apparatus can be provided by reducing the generated loss.

(3) The storage battery includes the first storage battery 7 and the second storage battery 8. The DC-DC converter includes the DC-DC converter 4 connected between the smoothing capacitor C3 and the first storage battery 7 and the DC-DC converter 5 connected between the smoothing capacitor C3 and the second storage battery 8. The control unit 9 boosts a voltage of the DC-DC converter 5 and controls the voltage (link voltage Vo) of the smoothing capacitor C3 to a predetermined voltage before starting a switching operation of the current resonance type converter 3. By boosting the DC-DC converter 5, it is possible to provide a highly efficient and compact charging apparatus by reducing the generated loss.

(4) The control unit 9 alternatively selects the DC-DC converter 4 or the DC-DC converter 5 that controls to a predetermined voltage. As a result, a DC-DC converter that controls the voltage (link voltage Vo) of the smoothing capacitor C3 to a predetermined voltage can be appropriately selected.

(5) The control unit 9 includes the voltage sensors 24 and 25 for detecting the voltages of the first storage battery 7 and the second storage battery 8. The control unit 9 compares the voltage of the first storage battery 7 with the voltage of the second storage battery 8 and selects the DC-DC converter 4 or the DC-DC converter 5 according to the compared voltage. As a result, it is possible to operate an optimum DC-DC converter according to the compared voltage.

(6) The voltage sensors 22 and 23 for detecting a voltage of the smoothing capacitor C3 and a DC voltage are included, and the control unit 9 determines whether to control to a predetermined voltage before starting switching of the current resonance type converter 3 according to whether a ratio of the voltage of the smoothing capacitor C3 and the DC voltage is equal to or higher than the predetermined value (steps S204 and S304). As a result, even when the voltage of the smoothing capacitor C3 is low, in the case where the voltage of the DC voltage is low, the boosting operation by the DC-DC converter can be omitted.

(7) The voltage sensor 22 for detecting a DC voltage (voltage of the smoothing capacitor C2) is included, and the control unit 9 calculates a predetermined voltage based on the DC voltage (steps S204 and S308). As a result, it is possible to set and control the predetermined voltage according to the input DC voltage.

(8) The AC-DC converter 2 is provided which inputs an AC voltage received from the AC power supply 6, performs power factor improvement control, and outputs a DC voltage. As a result, the charging apparatus corresponding to the input of the AC power supply 6 can be provided.

The present invention is not limited to the above-described embodiments. As long as characteristics of the present invention are not impaired, other embodiments envisaged within the scope of technical ideas of the preset invention are included in the scope of the present invention.

REFERENCE SIGNS LIST 1 charging apparatus
2 AC-DC converter
3 current resonance type converter
4, 5 DC-DC converter
6 AC power supply
7, 8 storage battery
9 control unit
11 to 14 current sensor
21 to 25 voltage sensor
C1 to C7 smoothing capacitor
Cr1, Cr2 resonance capacitor
D1 to D10, D23 to D25 anti-parallel diode
L1 to L4 chock coil
Lr1, Lr2 resonant inductor
N1 to N4 transformer winding
Q1 to Q11, Q23 to Q25 switching element
T1 to T10 terminal
Tr1, Tr2 transformer

The invention claimed is:

1. A charging apparatus, comprising:
a current resonance type converter comprising an inverter circuit configured to input a DC voltage and generate a rectangular wave voltage, a transformer configured to magnetically couple a primary winding and a secondary winding connected between output terminals of the inverter circuit, a resonant capacitor and a resonant inductor connected in series with the primary winding and/or the secondary winding, a rectifier circuit configured to rectify and output an alternating current output to the secondary winding, and a smoothing capacitor connected between output terminals of the rectifier circuit;
a DC-DC converter connected between the smoothing capacitor and a storage battery; and
a control unit configured to control the current resonance type converter and the DC-DC converter,
wherein, before starting a switching operation of the current resonance type converter, the control unit controls a voltage of the smoothing capacitor to a predetermined voltage which is higher than a voltage of the storage battery by boosting a voltage of the DC-DC converter.

2. The charging apparatus according to claim 1,
wherein the storage battery includes a first storage battery and a second storage battery,
the DC-DC converter includes a first converter connected between the smoothing capacitor and the first storage battery, and a second converter connected between the smoothing capacitor and the second storage battery, and
the control unit boosts a voltage of the first converter to control a voltage of the smoothing capacitor to the predetermined voltage before starting a switching operation of the current resonance type converter.

3. The charging apparatus according to claim 1,
wherein the storage battery includes a first storage battery and a second storage battery, the DC-DC converter includes a first converter connected between the smoothing capacitor and the first storage battery, and a second converter connected between the smoothing capacitor and the second storage battery, and the control unit controls a voltage of the smoothing capacitor to the predetermined voltage by boosting a voltage of the second converter before starting a switching operation of the current resonance type converter.

4. The charging apparatus according to claim 1,
wherein the storage battery includes a first storage battery and a second storage battery,
the DC-DC converter includes a first converter connected between the smoothing capacitor and the first storage battery, and a second converter connected between the smoothing capacitor and the second storage battery, and
the control unit alternatively selects the first converter or the second converter and boosts a voltage of the selected first or second converter to control a voltage of the smoothing capacitor to the predetermined voltage before starting a switching operation of the current resonance type converter.

5. The charging apparatus according to claim 4, comprising:
a storage battery detection unit configured to detect voltages of the first storage battery and the second storage battery,
wherein the control unit compares a voltage of the first storage battery with a voltage of the second storage battery and selects the first converter or the second converter according to the compared voltages.

6. The charging apparatus according to claim 1, comprising:
a voltage detector configured to detect the voltage of the smoothing capacitor and the DC voltage,
wherein the control unit determines whether to control a voltage of the smoothing capacitor to the predetermined voltage before starting switching of the current resonance type converter according to whether a ratio of the voltage of the smoothing capacitor and the DC voltage is equal to or greater than a predetermined value.

7. The charging apparatus according to claim 1, comprising:
a voltage detector configured to detect the DC voltage,
wherein the control unit calculates the predetermined voltage based on the DC voltage.

8. The charging apparatus according to claim 1, comprising an AC-DC converter configured to input an AC voltage to perform power factor improvement control and output the DC voltage.

* * * * *